US012528086B2

(12) United States Patent
Shkolnik et al.

(10) Patent No.: US 12,528,086 B2
(45) Date of Patent: Jan. 20, 2026

(54) PIPETTE TIP WASHING DEVICES AND METHODS

(71) Applicant: Agilent Technologies, Inc., Santa Clara, CA (US)

(72) Inventors: Cyrille Shkolnik, Palo Alto, CA (US); Eric Spence, San Jose, CA (US); Brian M. Sheldon, Katonah, NY (US); Dennis Garcia, Union City, CA (US); Andy Wu, Millbrae, CA (US)

(73) Assignee: AGILENT TECHNOLOGIES, INC., Santa Clara, CA (US)

(*) Notice: Subject to any disclaimer, the term of this patent is extended or adjusted under 35 U.S.C. 154(b) by 305 days.

(21) Appl. No.: 17/923,515

(22) PCT Filed: Apr. 30, 2021

(86) PCT No.: PCT/US2021/030200

§ 371 (c)(1), (2) Date: Nov. 4, 2022

(87) PCT Pub. No.: WO2021/222765

PCT Pub. Date: Nov. 4, 2021

(65) Prior Publication Data

US 2023/0211349 A1 Jul. 6, 2023

Related U.S. Application Data

(60) Provisional application No. 63/018,849, filed on May 1, 2020.

(51) Int. Cl.
*B08B 9/023* (2006.01)
*B08B 9/032* (2006.01)

(52) U.S. Cl.
CPC .............. *B01L 13/02* (2019.08); *B08B 9/023* (2013.01); *B08B 9/0327* (2013.01);
(Continued)

(58) Field of Classification Search
CPC .. B01L 13/02; B01L 2200/141; B01L 3/0275; B05B 15/555; B05B 7/0483;
(Continued)

(56) References Cited

U.S. PATENT DOCUMENTS

| | | | |
|---|---|---|---|
| 3,552,212 A | 1/1971 | Ohlin | |
| 4,495,149 A | 1/1985 | Iwata et al. | |

(Continued)

FOREIGN PATENT DOCUMENTS

| | | | |
|---|---|---|---|
| CN | 108514457 A * | 9/2018 | .............. A61L 2/18 |
| CN | 209736245 U | 12/2019 | |

(Continued)

OTHER PUBLICATIONS

Machine translation of CN108514457A (Year: 2018).*

(Continued)

*Primary Examiner* — Douglas Lee
(74) *Attorney, Agent, or Firm* — Lando & Anastasi, LLP

(57) ABSTRACT

Methods and apparatus are provided for washing pipette tips, including the inside and outside of the pipette tip. Pipette wash devices comprise a main body comprising a wash chamber, a liquid channel, a gas channel, and a nozzle cavity, and a nozzle for providing a washing mist is positioned in the nozzle cavity and fluidically connected with the liquid channel and the gas channel. Methods of washing a pipette tip include inserting a pipette tip in a wash chamber; spraying a mist on an outside surface of the pipette tip; and blowing pressurized air or inert gas on the outside surface of the pipette tip, thereby washing and drying the pipette. Methods of washing a pipette tip also include passing one or more series of liquid slugs separated by gaseous gaps through the inside of the pipette tip.

16 Claims, 7 Drawing Sheets

(52) U.S. Cl.
CPC ....... *B08B 9/0328* (2013.01); *B01L 2200/141* (2013.01); *B08B 2209/032* (2013.01)

(58) Field of Classification Search
CPC ... B08B 2209/032; B08B 9/021; B08B 9/023; B08B 9/0327; B08B 9/0328; A61B 90/70; A61B 2090/70; A61L 2202/24
See application file for complete search history.

(56) References Cited

U.S. PATENT DOCUMENTS

| | | | |
|---|---|---|---|
| 5,506,142 | A | 4/1996 | Mahaffey et al. |
| 5,592,959 | A | 1/1997 | Nagai |
| 5,827,744 | A | 10/1998 | Fose et al. |
| 6,422,248 | B1 | 7/2002 | Fuerst et al. |
| 7,300,525 | B2 | 11/2007 | Fuerst et al. |
| 10,228,382 | B2 | 3/2019 | Dockrill et al. |
| 10,232,411 | B2 | 3/2019 | Schopman |
| 2002/0020763 | A1 * | 2/2002 | Hirae .................... B05B 7/0433 239/418 |
| 2009/0041622 | A1 * | 2/2009 | Maeda .................. B08B 9/0321 422/63 |
| 2012/0227771 | A1 * | 9/2012 | Waterbury ......... G01N 35/1004 15/322 |
| 2014/0318574 | A1 | 10/2014 | Safavi |
| 2014/0377132 | A1 | 12/2014 | Shimase et al. |
| 2015/0276772 | A1 | 10/2015 | Dockrill et al. |
| 2016/0101423 | A1 | 4/2016 | Smith et al. |
| 2016/0195565 | A1 | 7/2016 | Peltier |

FOREIGN PATENT DOCUMENTS

| | | | | |
|---|---|---|---|---|
| DE | 10207499 | A1 | 9/2003 | |
| EP | 0725279 | A1 | 8/1996 | |
| JP | S62242858 | A | 10/1987 | |
| JP | 2003190845 | A * | 7/2003 | |
| JP | 2006187707 | A | 7/2006 | |
| WO | 9633805 | A2 | 10/1996 | |
| WO | WO-2011077523 | A1 * | 6/2011 | ........... B05B 7/0853 |

OTHER PUBLICATIONS

Abstract of JP2003-190845A (Year: 2003).*

EPO, "Extended European Search Report Received mailed on Mar. 26, 2024," Application No. 21797530.9, 8 pages.

PCt, et al., Notification of Transmittal of The International Search Report & Written Opinion mailed on Aug. 12, 2021, Application No. PCT/US2021/030200 , 13 Pages.

* cited by examiner

PIPETTE TIP WASHING DEVICES AND METHODS

CROSS-REFERENCE TO RELATED APPLICATIONS

This application is a US national stage entry of PCT/US2021/030200, filed Apr. 30, 2021, which claims the benefit of U.S. Patent Application No. 63/018,849, filed May 1, 2020, the contents of which are incorporated herein by reference in their entirety.

FIELD OF THE INVENTION

The present disclosure relates generally to devices and methods for washing a pipette tip.

BACKGROUND OF THE INVENTION

Disposable pipette tips have been used by laboratories and manufacturing for decades. A laboratory may use thousands of pipette tips to aspirate and/or dispense samples and reagents in its various analytical procedures. If the laboratory is not able or willing to reuse the pipette tips, the pipette tips are discarded after each use. The use of disposable pipette tips increases costs and efforts for those laboratories as they are required to continually purchase and restock pipette tips, and the discarded pipette tips increase the amount of waste generated. As laboratories strive to increase the number of samples processed and analyzed, the costs and waste due to disposing of pipette tips can become significant. There are also many applications where molded plastic disposable pipette tips do not have adequate properties for the application. This drives the need to use more expensive tips made from metal, ceramic, etc. which are not disposable. With non-disposable tips comes the need to wash them in between handling of different samples.

Laboratories may use manual methods to wash pipette tips, which may involve immersing in a wash solution or running water over them. Pipette washing methods must completely remove contaminants from the pipette tips so that there is no contamination from the pipette tip when used in a later experiment. Devices that are capable of automated washing of pipette tips could increase the efficiency of laboratories and reduce waste.

There is a need for an automated and highly reliable method for washing pipette tips so they may be reused in laboratory processes without contaminating later experiments.

SUMMARY OF THE INVENTION

As an aspect of the invention, a pipette wash device is provided. The pipette wash device comprises a main body comprising a wash chamber; and a mister configured for forming a mist in the wash chamber from a washing liquid and applying the mist to the exterior of a pipette tip. In some embodiments, the main body defines a cavity configured for holding the mister. In some embodiments, the mister comprises a nozzle that mixes liquid and gas to form the mist. In some embodiments, the mister comprises an ultrasonic device.

In some embodiments, the main body comprises the wash chamber, a liquid channel, a gas channel, and a nozzle cavity, wherein the liquid channel and the gas channel are fluidically connected with the nozzle cavity, and the nozzle cavity has a nozzle cavity exit fluidically connected with the wash chamber, and the mister comprises a nozzle configured for mixing liquid and gas at the nozzle exit to form a mist from the liquid and the gas, and the device is configured for spraying the mist into the wash chamber. In some embodiments, a nozzle comprises a central nozzle channel and a peripheral nozzle channel for passing fluids to a nozzle exit, wherein the central nozzle channel is fluidically connected with the liquid channel, and the peripheral nozzle channel is fluidically connected with the gas channel, and the nozzle is positioned in the nozzle cavity so that the nozzle exit is fluidically connected with the wash chamber. In some embodiments, the nozzle cavity is a plurality of nozzle cavities arranged around the wash chamber; In some embodiments, the nozzle cavities are arranged at equal intervals around a perimeter of a wash chamber, and the device comprises two, three, four or more nozzles. In some embodiments, the nozzle is a plurality of nozzles; the liquid channel is a plurality of liquid channels, wherein each of the liquid channels fluidically connects one of the nozzles to a liquid inlet of the main body; and the gas channel is a plurality of gas channels, wherein each of the gas channels fluidically connects one of the nozzles to a gas inlet of the main body. In some embodiments, the liquid inlet is a single liquid inlet in the main body, and/or the gas inlet is a single gas inlet in the main body.

In some embodiments, the nozzle comprises a nozzle cap and a nozzle restrictor, the nozzle restrictor comprises the central nozzle channel and the nozzle exit, the nozzle cap defines a nozzle flow path from the liquid channel of the main body to the central nozzle channel of the nozzle restrictor, and the nozzle cap comprises an alignment feature reciprocal to an alignment feature the main body. In some embodiments, the nozzle restrictor comprises a flange comprising perforations, wherein the nozzle restrictor is positioned so that the perforations are fluidically connected with the gas channel of the main body. In some embodiments, the nozzle restrictor comprises an alignment surface reciprocal to an alignment surface of the main body.

In some embodiments, the pipette wash device comprises a seal material positioned between the nozzle restrictor and a nozzle cavity wall, and/or a seal material positioned between the nozzle cap and the nozzle cavity wall.

In some embodiments, the pipette wash device comprises a main body which comprises a plenum fluidically connected to a gas inlet of the main body, and the device further comprises an air knife between the plenum and the wash chamber. In some embodiments, the air knife is formed by conical slit positioned at a downward diagonal angle to a wash chamber entrance, whereby an air knife is produced when gas is provided to the plenum. In some embodiments, the device further comprises a top cap attached to the main body and positioned to cover the plenum, and the top cap and the main body define the conical slit. In some embodiments, the wash chamber has a wash chamber entrance for entry a pipette tip and a wash chamber exit, and the device further comprises an exhaust tube fluidically connected to the wash chamber exit. In some embodiments, the exhaust tube undercuts the wash chamber exit.

As another aspect of the invention, a pipette washing system is provided. The pipette washing system comprises a pipette washing device as described herein, and a pump or vacuum fluidically connected to the exhaust tube. In some embodiments, the pipette washing system further comprises an apparatus such as a pipettor configured for pushing a fluid through an interior of a pipette tip, and the pipette wash device is configured for washing an exterior of a pipette tip. In some embodiments, the pipettor or other apparatus comprises valves and passages for introducing liquid and pressurized air to the interior of the pipette tip.

As another aspect of the invention, a method of washing a pipette tip is provided. The method comprises inserting a pipette tip in the wash chamber of a pipette wash device as described herein; spraying a mist formed from a washing liquid on an exterior surface of the pipette tip; and removing the washing liquid from the exterior surface.

As yet another aspect of the invention, a method of washing a pipette tip attached to a pipettor is provided. The method comprises providing liquid to an interior of the pipette tip; and providing a mist to at least a portion of an exterior of the pipette tip. In some embodiments, the method comprises blowing pressurized air or inert gas on the exterior surface of the pipette tip, thereby washing and drying the pipette. In some embodiments, the sprayed mist covers substantially all of the exterior surface of the pipette tip. In some embodiments, the mist is formed with 1.5 mL or less of a washing liquid per wash, or 0.75 mL or less of a washing liquid per pass. In some embodiments, the method comprises at least 2 cycles of spraying the mist and blowing air or inert gas. In some embodiments, the method excludes submersion of the pipette tip in a wash liquid such as a wash bath. In some embodiments, the mist is formed by a nozzle, such as a nozzle comprising a central nozzle channel and a peripheral nozzle channel for passing fluids to a nozzle exit, and the nozzle exit is fluidically connected with the wash chamber. In some embodiments, the wash chamber is within a main body, and the main body further comprises a liquid channel, a gas channel, and a nozzle cavity, wherein the liquid channel and the gas channel are fluidically connected with the nozzle cavity, and the nozzle cavity has a nozzle cavity exit fluidically connected with the wash chamber. In some embodiments, the central nozzle channel is fluidically connected with the liquid channel, and the peripheral nozzle channel is fluidically connected with the gas channel. In some embodiments, the liquid is deionized water and the gas is air. In some embodiments, the method further comprises washing the interior of the pipette tip by passing one or more series of liquid slugs separated by gaseous gaps through the pipette tip. In some embodiments, a gas flow provided to produce the gaseous gaps comprises different flow rates and/or pressures during the washing step. In some embodiments, a first series of liquid slugs comprises a wash buffer, and a second series of liquid slugs comprises deionized water. In some embodiments, the liquid slugs have a volume from about 10 μl to about 100 μl, or about 30 μl. In some embodiments, the method further comprises purging the interior of the pipette tip with pressurized air or inert gas to push substantially all of the liquid slugs and contaminant, if any, out of the pipette tip.

As another aspect of the invention, a pipette washing apparatus is provided. The apparatus comprises a liquid source configured to provide liquid to an interior of a pipette tip; and a mister configured to provide a mist to at least a portion of an exterior of the pipette tip. In some embodiments, the liquid source is a pipettor configured to provide liquid to the interior of the pipette tip when the pipette tip is attached to the pipettor. In some embodiments, the pipettor is configured to provide liquid in the form of liquid slugs to the interior of the pipette tip. In some embodiments, the pipettor is configured to provide the liquid slugs at a volume from about 10 μl to about 100 μl, or about 30 μl. In some embodiments, the pipettor is configured to provide gaseous gaps to the interior of the pipette tip. In some embodiments, the mister comprises a nozzle that mixes liquid and gas to form the mist. In some embodiments, the apparatus further comprises an air knife configured to provide a high-velocity directed air stream to an exterior of the pipette tip.

These and other features and advantages of the present devices and methods will be apparent from the following detailed description, in conjunction with the appended claims.

Figure 1:
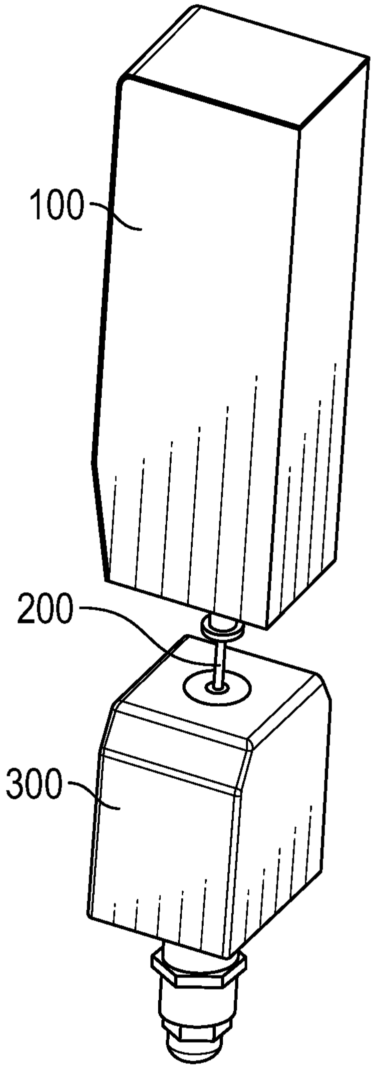
FIGS. 1 and 2 show a pipettor with a pipette tip lowered into an exemplary embodiment of the present washing device.

The present teachings are best understood from the following detailed description when read with the accompanying drawing figures. The features are not necessarily drawn to scale.

DETAILED DESCRIPTION

In view of this disclosure, it is noted that the present methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

One of the significant advantages of some embodiments of the present apparatus and methods is that the use of a pressurized gas such as compressed air can reduce or minimize consumption of a washing liquid and the generation of waste in washing a pipette tip. Another advantage of some embodiments is that the present method of washing a pipette tip can be performed very quickly, taking less than 30 seconds to thoroughly wash both the inside and the outside of a pipette tip in some embodiments. In some embodiments, the present methods and apparatus wash the outside of a pipette tip with one or more nozzles that mix compressed air with deionized water to create a mist, allowing for greater coverage of the outer surface of the pipette tip with a lower volume of washing liquid. Some embodiments of the present apparatus can also include separate features to provide a high-velocity directed air stream (which may be referred to as an air knife) to scrub and dry the outside of the pipette tip. In some embodiments, the present methods and apparatus wash the inside of a pipette tip using low flow compressed air to move small volumes of liquid (referred to as liquid slugs) through the inside of the pipette tip. High flow compressed air can then be used to eject all liquid and dry the inside of the pipette tip.

To wash the inside and outside of a pipette tip, some embodiments of the present methods and apparatus can use two separate devices together. The approach for both devices is very similar: a washing fluid is applied to the surface. The washing fluid wets, dilutes and/or begins to wash away residual reagent or sample that has been left on the surface of the pipette tip. A pressurized gas is then used to remove the mixture of washing fluid and residual sample or reagent from the surfaces. For example, a gas can be provided at a pressure of about 40 psi and at a flow rate of about 1.5 cubic feet per meter (CFM). In some embodiments, the two devices that work together to perform pipette tip washing are a pipettor configured for washing the inside of the tip (in addition to its main purpose of the pipettor is to aspirate and dispense liquids comprising reagents using the tip); and a pipette wash device configured for washing the outside of the pipette tip (in some embodiments this may be the primary or only purpose of the device configured for washing the outside of the pipette tip). In some embodiments, the present methods and apparatus can use one device that washes the inside and the outside of a pipette tip which has been removed from the pipettor. For example, a pipette wash device as described herein can further comprise a conduit, nozzle, or other feature configured to provide a washing fluid and a pressurized gas to the inside of a pipette tip and conduit, nozzle or other feature configured to provide a washing fluid to the outside of the pipette tip.

The present methods and apparatus can also include or be part of methods or systems for preparing samples for analysis. Such systems can include other devices to perform other functions, but which also may be unexpectedly beneficial with the present pipette tip washing apparatus. For example, the pipettor can be attached to a gantry for automated movement between different locations (e.g., between a sample preparation location and a washing location).

Figure 2:
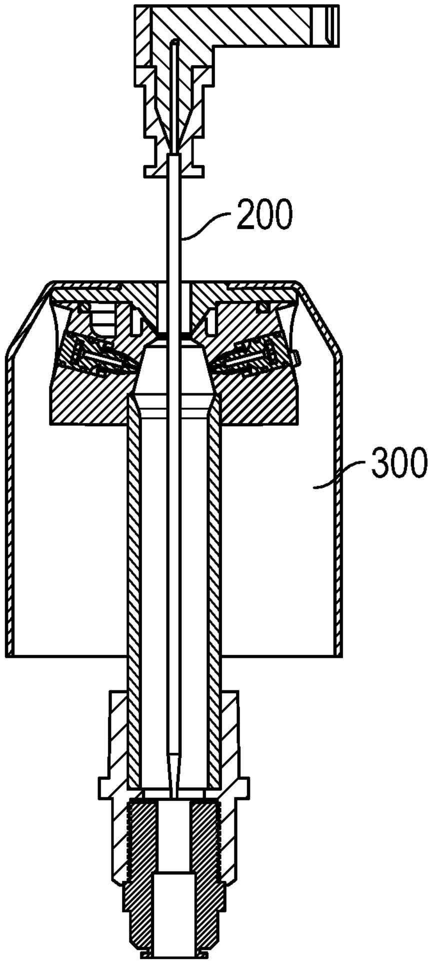

FIG. 1 shows an exemplary embodiment of the present apparatus comprising a pipettor 100 with a pipette tip 200 lowered into a wash station 300. FIG. 2 provides a cross sectional view of the pipette tip 200 lowered into the wash station 300. In some embodiments, the present apparatus comprises two devices (e.g., a pipettor and a wash station) configured to work together to wash a pipette tip.

Pipettor

The present methods and apparatus can include a pipettor that has a pipette tip. In some embodiments, the pipette tip is a disposable or reusable pipette tip. Reusable pipette tips require washing between uses to avoid contamination. It is also contemplated that the present methods and apparatus may be used with disposable pipette tips, thereby reducing cost and waste from replacing a pipette tip after a single use.

Among other functions, in some embodiments, the pipettor is adapted for transferring fluids by pipetting, including aspirating or dispensing fluids in volumes from 10 μl to 500 μl. A pipettor can also be adapted for mixing fluids in mixing strips; changing a pipettor tip; detecting liquid levels; and delivering water or solvent to a slide processing module or mixing strip for adjusting humidity. Of particular relevance to the present disclosure, the pipettor comprises one or more features adapted for washing the inside of a pipettor tip. A pipettor may interface with one or more, or all, of a processing module, a wash station, a pipette tip storage station, a reagent vial storage, and a gantry.

A pipette tip can be attached to the pipettor in any suitable way such as by using clamps, locks, or other mechanisms. In some embodiments, a pipettor and wash station work together to wash a pipette tip. For instance, the pipettor can perform and house the features for inside tip washing, and the wash station can perform and house the features for washing the outside of the pipette tip. In some embodiments, when the pipette tip is to be washed, the pipettor itself is moved to the pipette wash station and inserts the pipette tip inside.

In some embodiments, the pipettor washes the inside of a pipette tip by passing one or more liquid slugs through the pipette tip. The liquid slugs can have a small volume and can comprise water, solvent, or buffer. To minimize the volume of washing fluids utilized for washing, the washing fluid can be provided to the inside of the tip in liquid slugs having very small volumes, and gaseous gaps can be provided between the liquid slugs. The liquid slugs are typically separated or followed by a gaseous gap. For example, in some embodiments, the liquid slugs can have a volume from about 5 μ1 to about 300 μl, or from about 15 μl to about 150 μl. In some embodiments, the volume of liquid slugs of a wash buffer is from about 15 μl to about 50 μl, or about 30 μl. Low flow rate pressurized air can be used as the gaseous gaps, and they can move the liquid slugs through the pipette tip while keeping them intact. Exemplary flow rates for the gaseous gaps include ~0.017 CFM (+/−0.002 CFM). In some embodiments, the gaseous gaps provide both separation between the liquid slugs and a mechanism to continuously move the liquid slugs downwards and out the pipette tip. The gaseous gap can be formed inside a pipette tip by allowing low pressure air to enter between the liquid slugs, creating an air gap. In some embodiments, the gaseous gaps help to keep the liquid slugs substantially whole, which helps to scrub the inside surface of the pipette tip. In some embodiments, the pipettor and the wash station is controlled by a computer which make it possible to run a "short wash" or a "long wash" depending of the reagent (liquid class) that have been aspirated and dispensed. This will further minimize the volume of washing fluids. The type of washing routine or method could be controlled by the liquid classes to optimize the efficiency.

In some embodiments, the present methods comprise applying a second series of liquid slugs to the pipette tip, such as deionized water or another wash buffer. For example, liquid slugs comprising DI water can be passed through after a first series of wash buffer liquid slugs. In some embodiments, the volume of liquid slugs of water can be from about 45 μl to about 300 μl, or about 90 μl. The liquid slugs of deionized water rinse the wash buffer from the inside of the pipette tip, and prevent crystallization of components of the wash buffer inside the pipette tip. The number of liquid slugs passed through the pipette tip can be selected by a user or can be part of a predetermined washing protocol. For example, a washing protocol may comprise a number (X) of liquid slugs of wash buffer to be pumped through the pipette tip, and the liquid slugs are separated by gaseous gaps. Then a number (Y) of liquid slugs of water are passed through the pipette tip. In some embodiments, X and Y can be any number, such as a number from 1 to 10. Each liquid slug of deionized water can be followed by a gaseous gap (such as low pressure air), which helps to keep the liquid slugs substantially whole. In some embodiments, a gaseous blast (such as high flow rate air) is then passed through the pipette tip in order to flush all the washing liquids through the pipette tip and to help dry the pipette tip.

Figure 3:
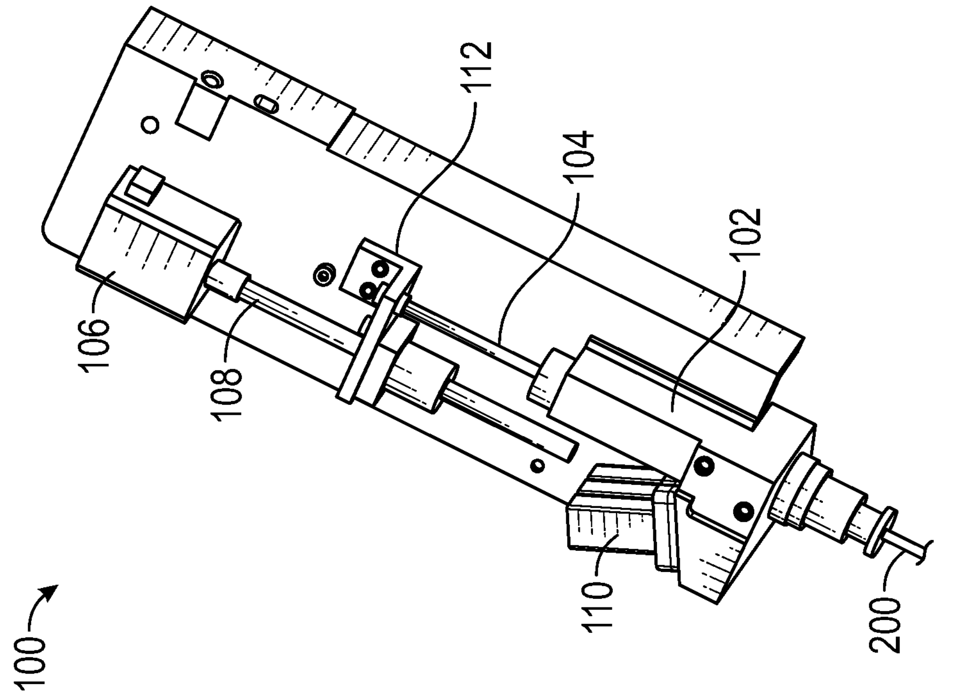

FIG. 3 illustrates an exemplary embodiment of a pipettor and shows some of the features for pipette tip washing. The pipettor 100 comprises an aspiration block 102, and a piston 104 which controls movement of fluids in and out of a pipette tip connected to the aspiration block 102. The piston 104 can be actuated by any suitable mechanism. In FIG. 3, a motor 106 spins a lead screw 108, which moves a stage 112, thereby causing the piston 104 to move up and down. The piston 104 is moved up to aspirate a fluid into the tip and down to dispense the fluid out of the tip. The pipettor 100 also comprises a valve pack 110 for controlling which fluids are provided to the tip. In some embodiments, the pipettor is configured to deliver at least two types of liquids to the pipette tip for washing its inside surfaces. For example the pipettor can be configured to deliver one or more washing fluids, such as a wash buffer and deionized (DI) water. The wash buffer can act as a detergent, to dislodge and wash away any residual of a previously used reagent. Suitable wash buffers include Dako Wash Buffer. The DI water is then used to wash away any remains of the wash buffer. Pressurized air or other gas can be used to move the washing liquid through the inside of the tip and/or to clear and dry the same inside surfaces. The pressurized gas can be provided at two different flow rates (low & high) to perform different steps or functions.

Figure 4:
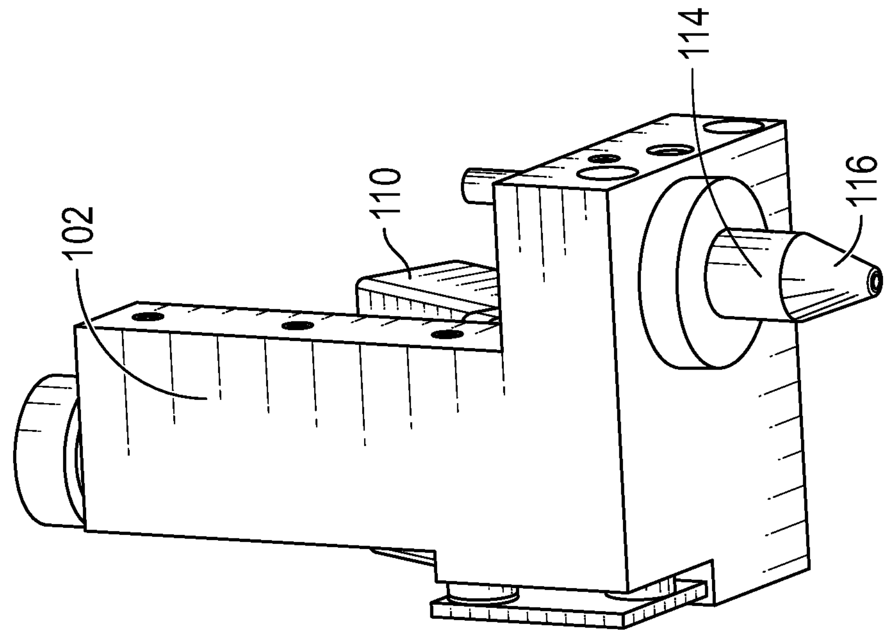
FIGS. 3 and 4 illustrate an exemplary embodiment of a pipettor with features for pipette tip washing.
Figure 5:
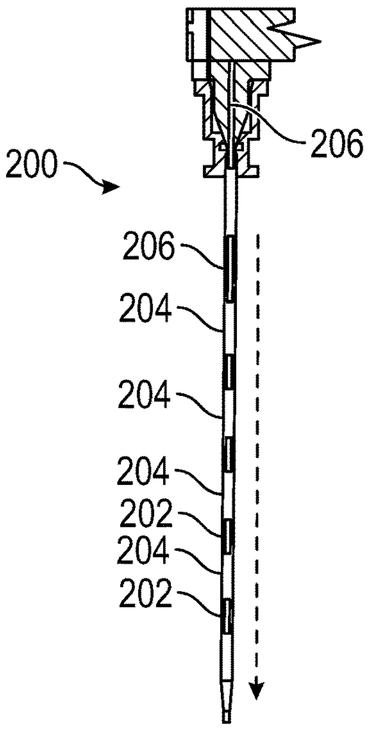
FIG. 5 illustrates an exemplary embodiment of the present washing methods in which liquid slugs are pushed through a pipette tip.

FIG. 4 provides a view of an exemplary embodiments of the aspiration block 102. One or more washing liquids and one or more pressurized gases can enter the aspiration block 102 from conduits, valves or other routes. In FIG. 4, a valve pack 110 controls delivery of the washing fluids, pressurized gas, and other fluids (such as reagents, solvents and buffers) to the aspiration block 102. When washing the pipette, washing fluids are delivered through the aspiration block 102 to its outlet 114 and then pass through the pipette tip. As described above, the washing fluid can be provided to the inside of the tip in liquid slugs having very small volumes, and gaseous gaps can be provided between the liquid slugs. After the liquid slugs have moved through and exited the pipette tip, the pipettor/aspiration block delivers high flow, pressurized gas through the inside of the tip for a time sufficient to remove all liquid remaining in the pipette tip and to dry it. Suitable flow rates for the high flow gas include ~0.113 CFM (+/−0.005 CFM). The outlet 114 of the aspiration block 102 can be surrounded by a nipple 116 to facilitate attachment of a pipette tip FIG. 5 illustrates an exemplary embodiment of how the present washing methods can wash the inside of a pipette tip 200. Liquid slugs 202 of a wash buffer are passed through the pipette tip. In some embodiments, the liquid slugs 202 have a volume of approximately 30 μL and are separated by air gaps 204. After a suitable number have passed through, liquid slugs 206 of deionized water are passed through the pipette tip. The water liquid slugs 206 are also separated by air gaps 204 and have a volume of approximately 90 μL.

Wash Station

Figure 6:
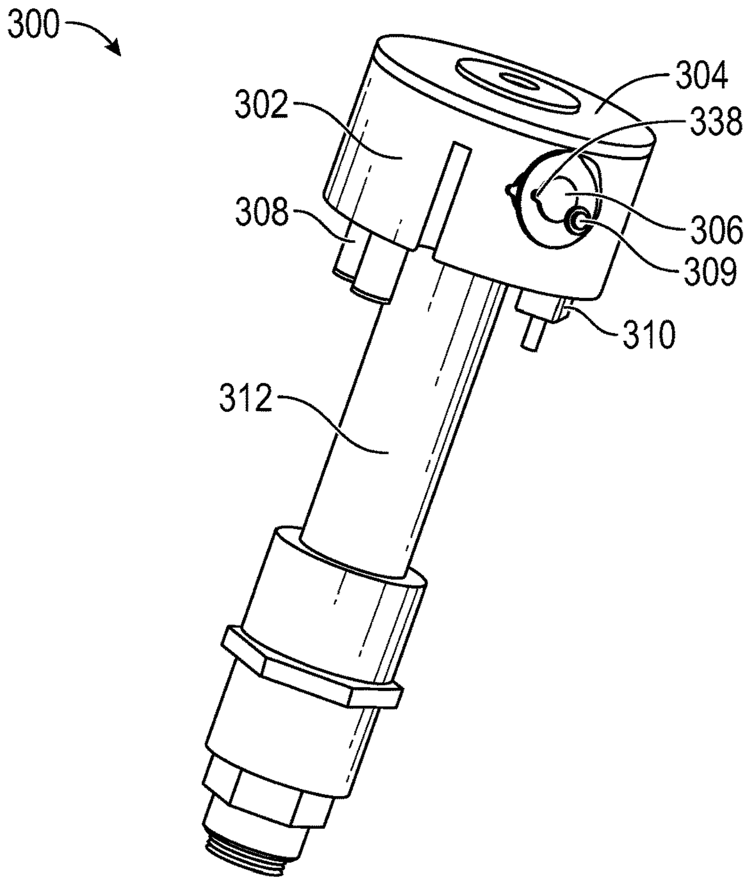
FIG. 6 illustrates an exemplary embodiment of the present pipette wash devices.

In some embodiments, the present apparatus comprises a wash station, a device configured for washing a pipette tip. FIG. 6 illustrates an exemplary embodiment of a pipette wash station and some of its components, which include a main body 302, a top cap 304, and one or more nozzles 306. The main body 302 is configured to receive a liquid and a gas through its inlets and to direct the liquid and gas to the nozzles 306. In the embodiment illustrated in FIG. 6, the wash station 300 has a gas inlet fitting 308 and a liquid inlet fitting 310 connected to the main body's gas inlet and liquid inlet, so that a gas and a liquid can be provided to the nozzles. In some embodiments, the wash station 300 has a single gas inlet fitting 308 and a single liquid inlet fitting 310. In other embodiments, the wash station has multiple gas inlets and gas inlet fittings, such as when separate gas inlets are connected to the nozzles 306 and an air knife slit 354 (described below). The wash station 300 also comprises an exhaust tube 312 fluidically connected to an exit of the main body 302.

Figure 7:
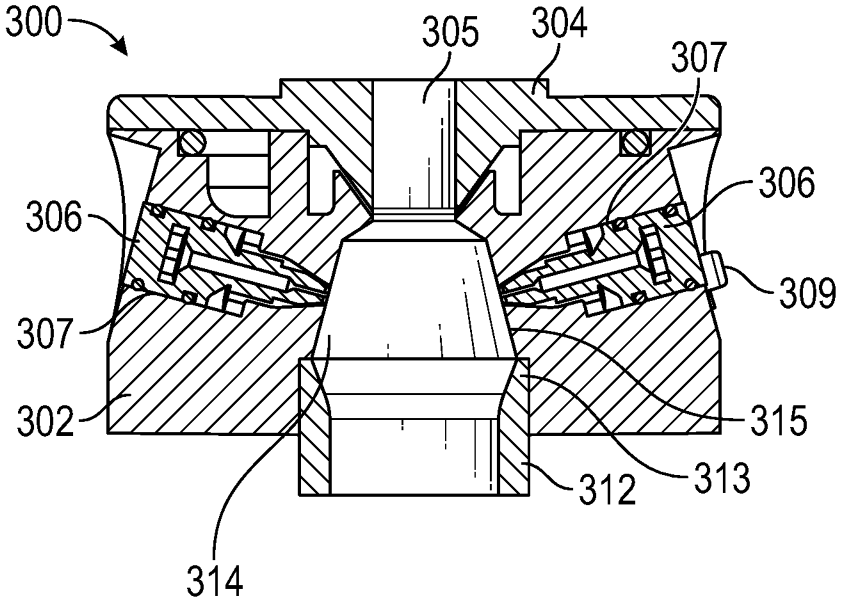
FIG. 7 shows a cross section view of an exemplary embodiment of the present pipette wash devices.

FIG. 7 shows a cross-sectional view of the exemplary pipette wash station 300 which is configured for washing the outside surface of a pipette tip. The wash station 300 has a wash chamber 314 in which a wash mist can be applied to a pipette tip. As part of a pipette washing protocol, a pipette tip can be inserted into the wash station 300 through a top cap aperture 305. In the embodiment of FIG. 7, the wash station has two nozzles 306 arranged on either side of a wash chamber 314. The nozzles 306 are integrated into the main body 302 of the wash station 300, and they are positioned and aligned in nozzle cavities 307 of the main body 302. The nozzles 306 are fastened to the main body 302 by a screw 309, though other fastener systems can be employed. The nozzle cavities have nozzle cavity exits that are fluidically connected with the wash chamber 314. When a pipette tip is present, the nozzles 306 can be used to spray a wash mist into the wash chamber 314. The wash mist and material washed off the pipette tip exit the wash station 300 through exhaust tube 312. In some embodiments, an exhaust tube entrance 313 undercuts a wash chamber exit 315 to avoid buildup of waste material.

Figure 8:
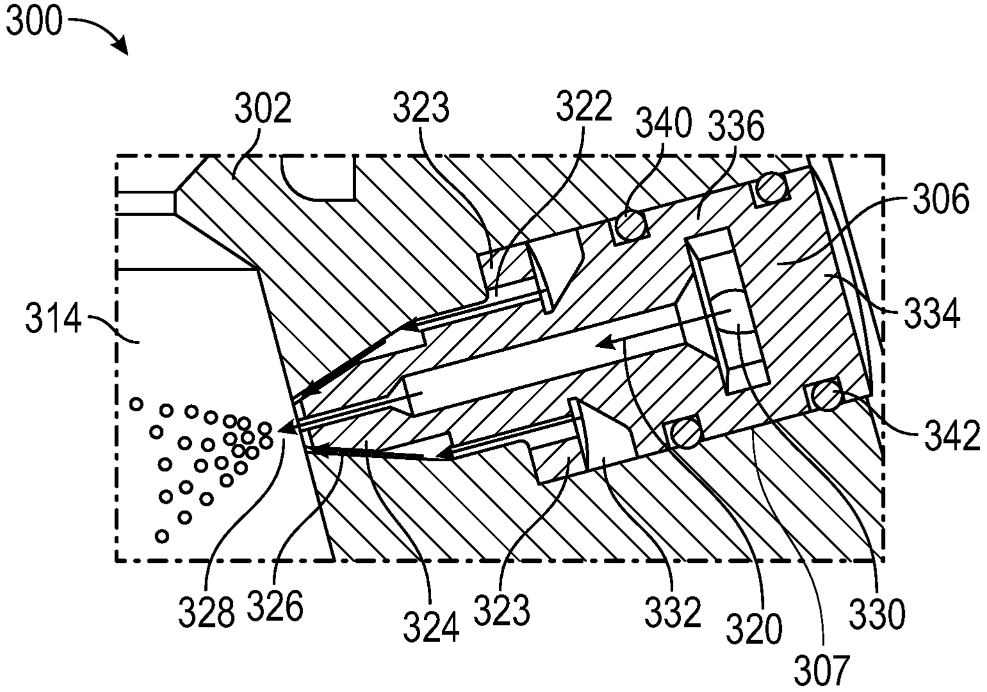
FIG. 8 illustrates operation of a nozzle in the embodiment of FIG. 7.

FIG. 8 shows a closer cross-sectional view of an exemplary embodiment of one of the nozzles 306 of wash station 300. FIG. 8 illustrates a washing liquid passing through a central nozzle channel 320 while pressurized air is directed through a peripheral nozzle channel 322, and then the pressurized air passes between a narrow gap formed by the outside of the nozzle nose 324 with a nozzle cavity wall 326. Nozzle 306 passes the washing liquid and the pressurized gas to a nozzle exit 328 where a mist is formed by the gas shearing the liquid, and the nozzle 306 is positioned in the nozzle cavity 307 so that the nozzle exit 328 is fluidically connected with the wash chamber 314 to spray the mist into it. Thus, the nozzle is configured for mixing liquid and gas at the nozzle exit to form a mist from the liquid and the gas, and the device is configured for spraying the mist into the wash chamber.

The washing liquid and pressurized gas are provided to the nozzle 306 by channels in the main body 302. More particularly, the central nozzle channel 320 is fluidically connected with a liquid channel 330 in the main body 302, and the peripheral nozzle channel 322 is fluidically connected with the gas channel 332. In some embodiments, the nozzle 306 comprises a flange 323 comprising perforations, which provide at least a portion of the peripheral nozzle channels 322. In the illustrated embodiment, the nozzle 306 is a two-piece nozzle comprising a nozzle cap 334 and a nozzle restrictor 336, though it is also contemplated that the nozzle 306 can be one piece or more than two pieces. The nozzle restrictor 336 defines the central nozzle channel 320 and the nozzle exit 328, and the nozzle cap 324 defines a nozzle flow path from the liquid channel 330 of the main body 302 to the central nozzle channel 320 in the nozzle restrictor 336. In some embodiments, the nozzle cap 330 comprises an alignment feature 338 (shown in FIG. 6) reciprocal to an alignment feature the main body 302, such as a notch reciprocal to a tab. In some embodiments, the nozzle restrictor comprises an alignment surface reciprocal to an alignment surface of the main body.

In order to wash a pipette tip, the nozzles 306 can use DI water or other washing liquid, along with pressurized air or other gas to create a wash mist. As the washing liquid and the pressurized gas exit the nozzle 306 at or near the entrance to the wash chamber 314, the pressurized gas shears the washing liquid, creating a washing mist. A significant advantage of using a washing mist is that it uses less wash fluid compared to using a stream or bath of washing liquid. Another advantage is that the spray pattern of the washing mist fans out, allowing for a larger coverage of washing liquid onto the outside surface of the pipette tip.

In some embodiments, the nozzle 306 can be made of an inert material, such as stainless steel, polyether ether ketone ("PEEK"), or other polymeric, ceramic, metallic, and or composite materials. The nozzle 306 can be positioned in the nozzle cavity 307 so that its circular flange 323 rests against a wall of nozzle cavity 307. The nozzle restrictor can be positioned at a depth in the nozzle cavity so that the perforations 322 are fluidically connected with the gas channel 332 of the main body. In some embodiments, the device 300 can also include a seal material 340 positioned between the nozzle restrictor and a nozzle cavity wall, and/or a seal material 342 positioned between the nozzle cap and the nozzle cavity wall.

Figure 9:
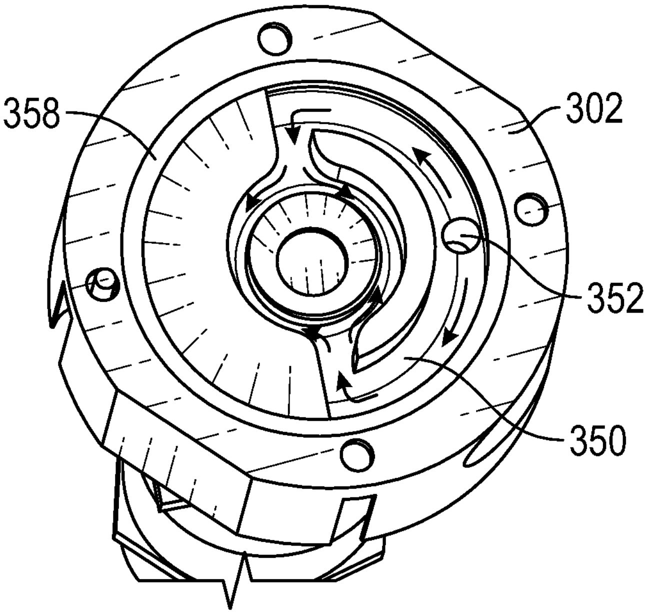
FIGS. 9 and 10 illustrate another feature of an exemplary embodiment of the present pipette wash devices.
Figure 10:
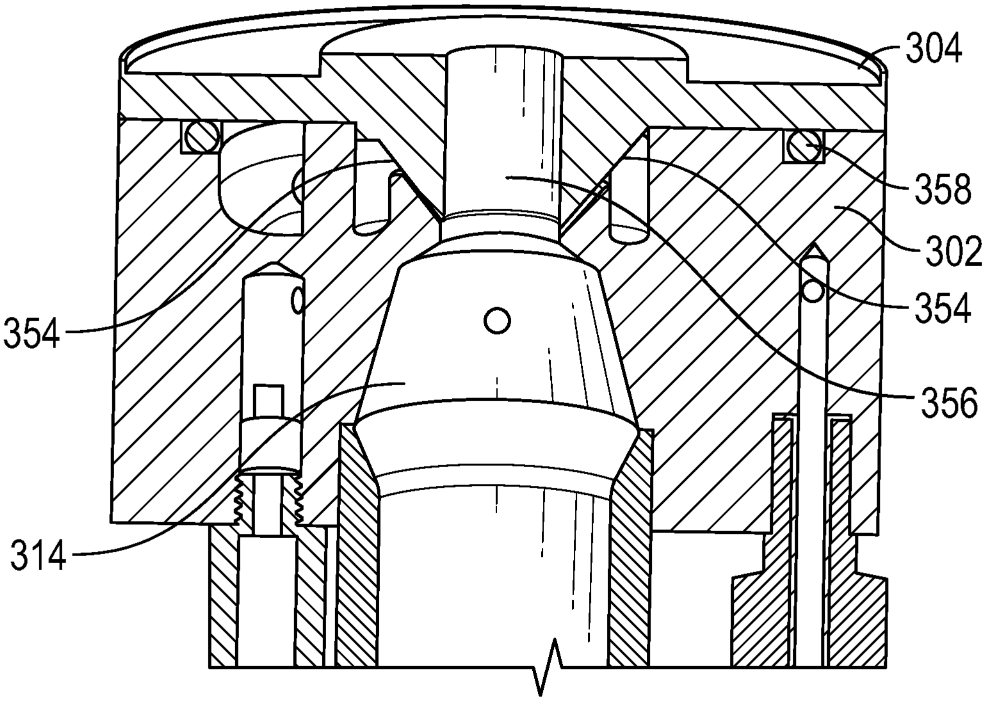

FIGS. 9 and 10 illustrate another feature of an exemplary embodiment of the wash station 300. In the illustrated embodiment, the wash station is configured for washing the outside surface of a pipette tip with an air knife produced by operation of the device. The air knife is a high velocity gas flow that is directed onto the outside of the pipette tip. The air knife can be produced by geometrical features (such as a slit) in the main body 302, optionally in cooperation with the top cap 304. In some embodiments, a top cap is attached to the main body and positioned to enclose an open portion of the main body, and the top cap and the main body define the conical slit.

In the exemplary embodiment of FIG. 9, a plenum 350 is formed in the main body 302. The plenum 350 is fluidically connected to a gas inlet 352 of the main body 302. Pressurized air enters the plenum 350 in the main body 302 and is directed into a conical, narrow air knife 354 slit (shown more clearly in FIG. 10) between the plenum and the wash chamber 314 whereby an air knife is produced when gas is provided to the plenum. The exemplary embodiment of FIG. 10 also shows how top cap 304 and main body 302 cooperate to form the conical slit 354. A seal material 358 prevents gas from escaping the wash station 300. The air knife slit 354 directs the pressurized air to the outside of the pipette tip. In some embodiments, the conical air knife slit substantially surrounds the pipette tip, and has an angle of 90 to 180° from a main axis of an entrance to the wash chamber or a main axis of the pipette tip inserted into the wash chamber, alternatively 38° from such a main axis. The conical slit 354 can be positioned at a downward diagonal angle to the wash chamber entrance 356 whereby an air knife is produced when gas is provided to the plenum. The air knife can be used to dry the outside surface of the pipette tip and scrub away any residual contaminants along with washing liquid deposited on the tip by the nozzles. An advantage of using air or other pressurized gas is that it is touch-free, so there is no wear on any parts of the wash station or the tip, and there is also no need to replace or clean air like one would do with a cloth or a sponge using to remove and dry a surface.

Figure 11A:
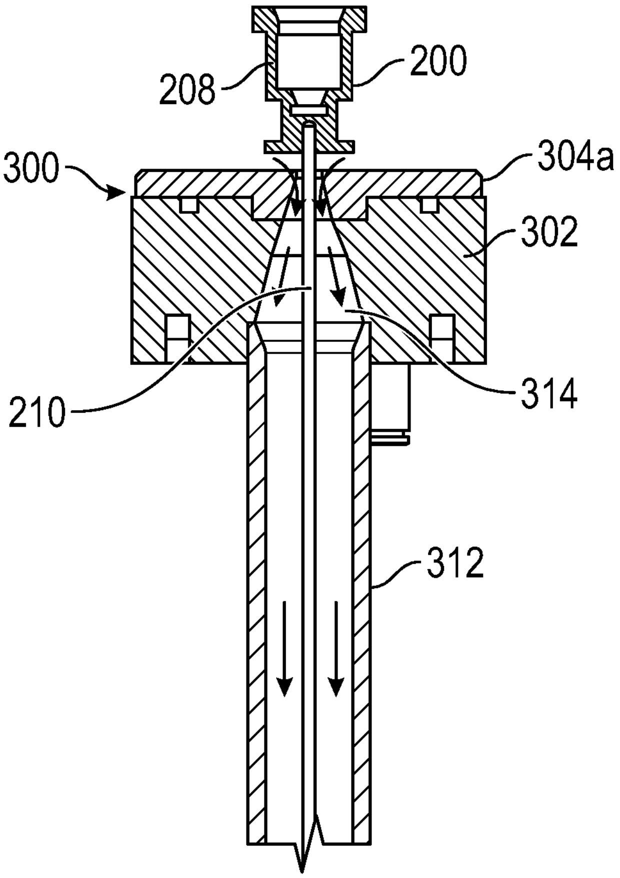
FIGS. 11A and 11B illustrates another exemplary embodiment of a pipette wash station.
Figure 11B:
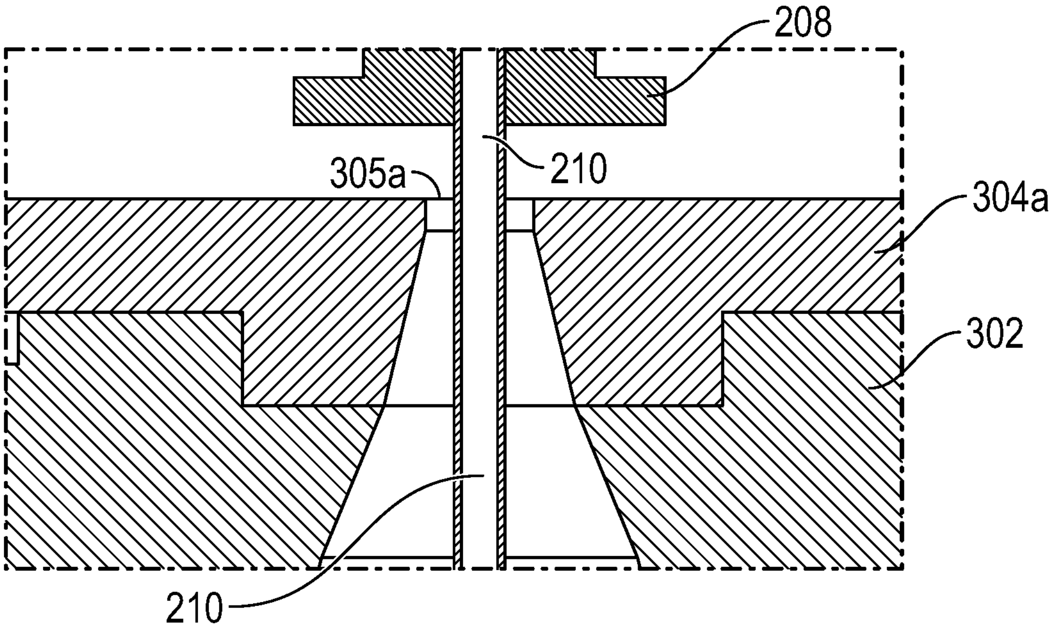

FIGS. 11A and 11B show a cross-sectional view of another embodiment of a pipette wash station 300 configured for washing the outside surface of a pipette tip 200 which comprises a pipette adapter 208 and a pipette tube 210. Wash station 300 comprises a top cap 304*a* and a main body 302 comprising a wash chamber 314 in which a wash mist can be applied to the pipette tube 210 a pipette tip. Wash station 300 also comprises an exhaust tube 312 connected to a low pressure source such as a vacuum. As part of a pipette washing protocol, a pipette tip can be inserted into the wash station 300 through a top cap aperture 305*a*. In the embodiment of FIG. 11A-11B, the wash station also comprises nozzles arranged on either side of a wash chamber, as illustrated in FIGS. 7 and 8. The nozzles 306 can be used to spray a wash mist into the wash chamber 314. The wash mist and material washed off the pipette tip exit the wash station 300 through exhaust tube 312.

In this embodiment, the top cap and main body do not include features to provide a high-velocity directed air stream (or air knife); rather than driving a positive pressure gas into the main body 302, a negative pressure is applied through the exhaust tube 312 to remove gas and liquid. The top cap 304*a* employs a wash station aperture that receives the pipette tube 210 and has a small diameter (for example, having a diameter of from about 0.1 mm to about 2 mm bigger than the diameter of the pipette tube 210) to accelerate the air or gas being drawn into the main body 302 by the negative pressure through the exhaust tube 312. This accelerated air or gas is concentrated in the small area where the diameter is the smallest to push off any remaining liquid off the outside surface of pipette tube 210, as the pipette tube 210 travels vertically past this area.

FIG. 11B is a closer view of the pipette tip 200 inserted into a wash station 300, and it illustrates that top cap 304*a* comprises a top cap aperture 305*a* through which air or other gas is drawn in. Top cap aperture 305*a* is configured to receive a pipette tip and accelerate air or gas drawn over an exterior of said pipette tip.

In some embodiments, various features of the present methods and apparatus can work in unison to achieve a pipette tip that is washed on both its inside and outside surfaces in less than 30 seconds. A pipettor can be automatically moved along one or more axis (X, Y, and/or Z axis) such as by operation of a pipettor that carries the tip. The gantry and other devices can be positioned so that the pipettor can be moved horizontally to the wash station, then up and down to place the pipette tip in and out of the wash station. The pipette tip can be subjected to two or more washing passes, with each pass taking about 12 seconds, to achieve thorough washing, without substantial residual contaminants. A step-by-step washing process for one washing pass is described below (in some embodiments, as soon as the first washing pass is done, a second washing pass can be performed):

A pipette tip starts to lower into the wash station;

As soon as the pipette tip is inside the wash chamber in the wash station, the nozzles turn on and spray a wash mist on the outside of the pipette tip;

At the same time (or before or after), liquid slugs comprising wash buffers are passed through the inside of the tip (for example, at least 8 liquid slugs for a thorough wash);

The tip continues into the wash station, and as the tip reaches the bottom (such that it is fully inserted), the nozzles shut off, while the liquid slugs continue to get pushed through the inside of the pipette tip using low flow rate pressurized air After the wash buffer liquid slugs are finished, they are followed by liquid slugs comprising DI water (e.g., at least 4 liquid slugs for a thorough wash), pushed through the pipette tip in the same manner When the liquid slugs are finished, the high flow rate air blast is applied to the inside;

At the same time (or before or after), the pipette tip starts to move upwards and the air knife is applied to the outside;

As the end of the pipette tip gets close to the top of the wash chamber, the high flow rate air blast is stopped;

As the pipette tip exits the wash chamber, the air knife is stopped;

The pipette stops at the top, and it can be moved or reinserted for another washing pass.

Figure 12:
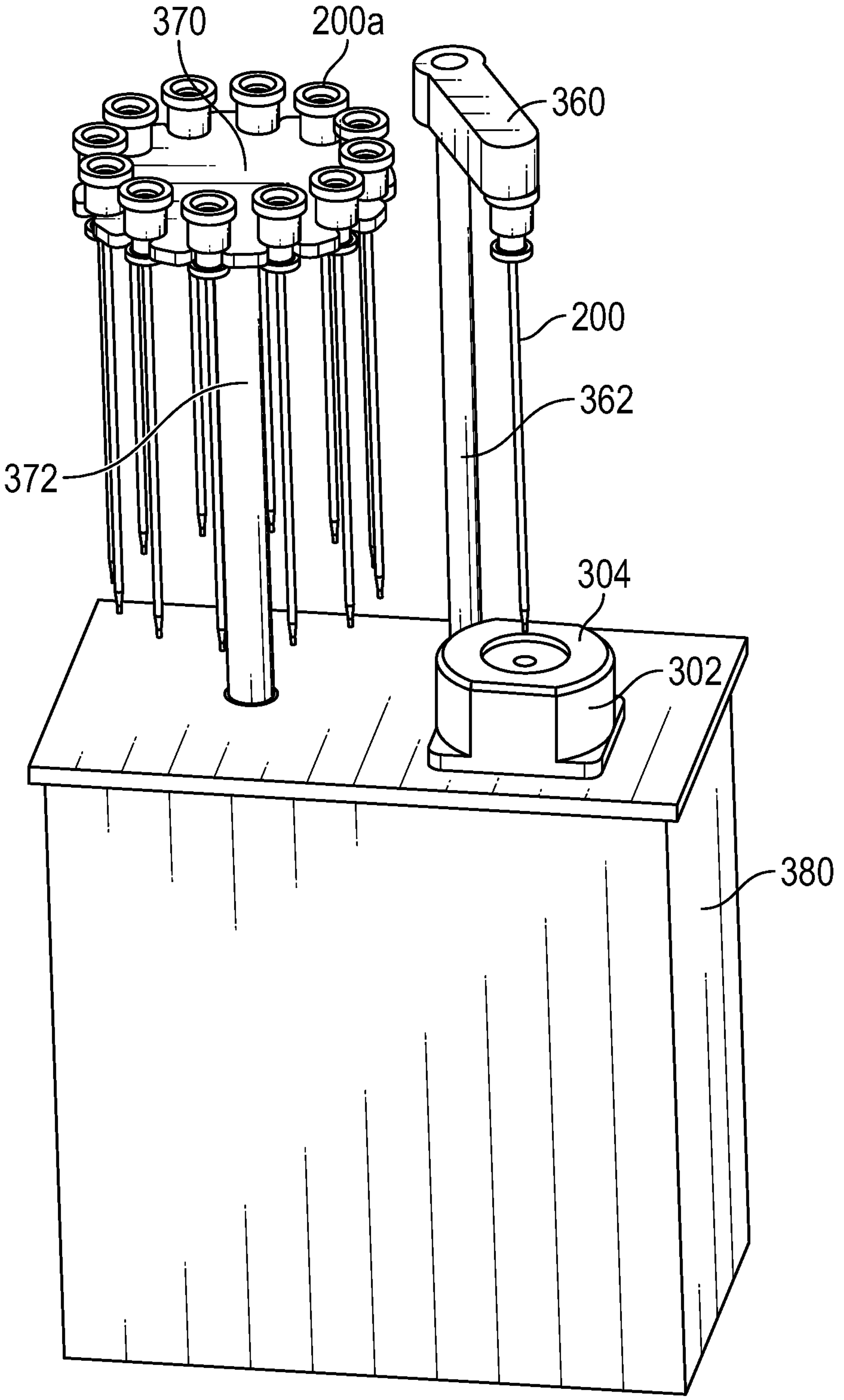
FIG. 12 illustrates another exemplary embodiment of the present pipette wash devices.

In the exemplary embodiment of FIG. 12, a pipette tip washing system comprises a wash station 300, a wash arm 360, and a pipette tip storage station 370. Wash station 300 includes a main body 302, a top cap 304, and other components as described above, such as a mister and a main body comprising a wash chamber, though such components are not visible in FIG. 12. Wash station 300 is affixed to a wash station housing 380, which may also house other components of the pipette tip washing system such as tubing, pumps, and motors. A pipette tip 200 is attached to a wash arm 360 which can lower the pipette tip 200 into the wash station 300 so that it can be washed. In some embodiments, wash arm 360 comprises a liquid source configured to provide liquid to an interior of a pipette tip, such as by providing a washing liquid (such as a wash buffer or deionized water) in the form of liquid slugs to the interior of the pipette tip. The wash arm 360 can also provide is configured to provide gaseous gaps to the interior of the pipette tip (such as air gaps). The pipette tip 200 can be attached to the wash arm 360 in any suitable way such as by using clamps, locks, or other mechanisms. In some embodiments, wash arm 360 has one or more magnets and the pipette tip 200 comprises a magnetically attracted material, to facilitate attachment.

In FIG. 12, wash arm 360 includes a wash arm post 362 which is capable of rotation around its axis, but other ways of enabling the wash arm to move in one, two or three dimensions are also contemplated, such as by mounting a wash arm on a gantry. Wash arm post 362 and/or pipette tip storage station post 372 may be configured for rotation, and a motor or other actuator for rotation can be housed in wash station housing 380. Wash arm 360 is generally configured to move in X- and Z-directions to transfer a pipette tip 200 between the storage station 370 and the and wash station 300. Wash arm 360 picks up a dirty pipette tip 200 from pipette tip storage station 370 and moves it into the wash station 300. The pipette tip 200 can be washed by moist air and an air-knife, as the wash chamber runs below ambient pressure to keep moist air inside the wash chamber. Misters provide deionized water and air to create moist air. Liquid waste is collected at wash chamber exit and pumped away. After the pipette tip 200 has been washed, the wash arm 360 returns it to the storage station 370 and detaches. The storage station 370 rotates so that another pipette tip 200*a* can be picked up for washing.

The pipette tip storage station 370 can have storage capacity for any desired number of pipette tips, for example, 6, 8 or 10 pipette tips. In some embodiments, the storage station 370 holds dedicated pipettes tips, such as pipette tips that are only used for selected reagents or liquids, for example Clearify, DAB and ethanol. The storage station 370 is configured to move the stored pipette tips 200*a* into position for attachment to a pipettor or a wash arm.

In some embodiments of the present pipette tip washing methods, a short or a long tip wash is performed, depending on reagent. In some embodiments, a short wash is <13 s and applies <2 mL of washing liquid. In some embodiments, a long wash is <25 s and applies <3 mL of washing liquid.

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

In some embodiments of the present apparatus, the main body comprises a channel (e.g., a liquid channel or a gas channel or bath) having one entrance and N exits, wherein N is the number of nozzle cavities. The exits are part of the same channel (i.e. connected), and multiple exits are provided. In some embodiments, the nozzle cavities are located on a constant radius arc around the wash chamber of the main body.

Channels can be connected to gas or liquid sources in any suitable way. For gas channels, fluid-tight sealing may be less important, and suitable connection mechanisms for connecting the gas conduits to an entrance of the main body include barbed fittings, luer lock style connectors, push-to-connect fittings, or glue bonding. Gas and liquid fittings can be metal or plastic and attached to the inlets of the main body using compression fittings, ferrules, or other known connectors or by permanent methods such as with an adhesive or welding or brazing if the materials of the conduits and main body allow for it.

As explained above, the pipettor can be configured to move between two or more pipettor positions, where it can engage the washing station in one of the positions. The pipettor can be changed or switched from one pipettor position to another pipettor position by manual movement, including linear or translational movement, rotational movement, or combinations thereof.

A controller such as a data processing unit, a conventional PC or workstation, can be connected to one or more of the present devices in order to receive information and/or control operation. For example, the controller might control operation of the pipettor and receive there from information regarding the actual working conditions (such as fluid pressure). The controller might also control operation of the washing liquid and/or gas supply (for instance setting control parameters such as pressure or vacuum level) and might receive therefrom information regarding the actual working conditions (such as flow rate, vacuum level, etc.). The controller might further control operation of the pipette wash device (for instance controlling washing fluid and/or gas provided to the nozzles).

In some embodiments, the present devices also comprise a fastener system for affixing the main body and/or the top cap and/or the nozzles to each other. A fastener system can provide the force to seal and/or align the nozzles and nozzle cavities on the main body and/or to seal the top cap to the main body. The fastener system can be one or more fasteners and one or more holes in the main body and the nozzles configured for receiving a fastener. The holes can be clearance holes or threaded holes, such as when the fastener is a bolt, screw, or pin. When the fastener is a bolt, the clamping system may comprise a nut with threads matching the bolt. Alternative manners of clamping the nozzle and/or the top cap with the main body are contemplated. The nozzles can be fastened to the main body by a snap-fit, or friction-fit, or in any other suitable manner. The fastener system can comprise two, three, four or more aligned holes, and a corresponding number of fasteners.

In some embodiments described above, an entrance or exit of a channel, or a flow path or conduit of the main body, nozzle, aspiration block, or other structure, is surrounded by a compliant seal material, such as a resilient, essentially fluid impermeable material. In some embodiments, the compliant seal material is in the form of an O-ring. The compliant seal material can be any shape suitable for an entrance or exit within the present device. For example, the compliant seal material may be a toroidal-shaped O-ring, a gasket with a rectangular cross-section, a metallic gasket, or another shape of compliant seal material. In situations where multiple seals need to be made on the same surface, the compliant seal material can integrate the function of multiple O-rings and/or gaskets and have multiple holes. In some embodiments, the compliant seal material can be a fluoroelastomer material. The compliant seal material can be various rubbers depending on the fluids used in the devices, e.g. fluoropolymers, buna-n, EPDM or, in extreme cases, metallic with compliant over-plating. The compliant seal material may also be coated with a chemically inert coating if the compliant seal material allows for it. In some embodiments, a sealing surface may be formed of a soft metal such as copper or aluminum, or a material such as PEEK or nylon, can also be used.

A recess or other feature on a main body, a nozzle, an aspiration block or other structure can align the compliant seal material and help to hold the compliant seal material on the main body during assembly of the connection device. The recess depth can be specified to determine how much the compliant seal material will compress to form a fluid-tight seal before the sealing surface of the main body bottoms out. In some embodiments where the compliant seal material is in the form of an O-ring, the O-ring should compress by 15% to 25%, or by 20%, to create a fluid-tight seal. Alternatively, a flat or cylindrical gasket could be used as the resilient seal instead of an O-ring, and different compression percentages may be selected.

In some embodiments, the present system can also comprise one or more pumps for applying a high pressure or vacuum. In some embodiments, a pump is fluidically connected to an exhaust tube so as to apply a vacuum for removing waste fluids from washing a pipette tip. A pump may be connected to apply an elevated pressure, such as by supplying air or other gas at a high pressure. Examples of suitable gas sample pumps include diaphragm pumps and vacuum pumps.

The term "channel" generally encompasses any structure configured to define a flow path for fluid to travel. A channel typically has an entrance and an exit, though in some embodiments, a channel can have multiple entrances and/or exits, such as where a channel with two or more entrances converges or joins to one exit, or where a channel with one entrance diverges or splits to two or more exits. For instance, a channel may be a hole or set of holes in a body or a block, or it may be a channel formed in a substrate by removing material from a substrate or by a combination of substrates, such as two or more layers bonded together, or a channel may be a conduit inside or outside another component. The geometry of a channel may vary widely and includes circular, rectangular, square, D-shaped, trapezoidal or other polygonal cross-sections. A channel may comprise varying geometries (e.g., rectangular cross-section at one section and trapezoidal cross-section at another section).

The terms "block" or "body" generally encompasses any structure that comprises one or more channels, such as by a channel formed in a block or body. In some embodiments, a block or body comprises multiple channels, whereby separate fluids may flow through the block or body. In some embodiments, a block or body comprises a manifold in communication with one or more interior flow paths and/or one or more external flow paths.

"Positive pressure" is a pressure greater than the surrounding environment, such as greater than atmospheric pressure. The pressure gradient between positive pressure and the ambient pressure will propel a fluid away from the positive pressure and toward the low pressure area. "Reduced pressure" is a pressure less than the surrounding environment or a sub-ambient pressure. "Suction" is the flow of gas into a partial vacuum or region of reduced pressure. The pressure gradient between this region and the ambient pressure will cause the matter to move toward the reduced pressure area. In certain embodiments, a sub-atmospheric pressure is a reduced pressure.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that each intervening value, to the tenth of the unit of the lower limit, unless the context clearly dictates otherwise, between the upper and lower limits of that range is also specifically disclosed. Where the stated range includes one or both of the limits, ranges excluding either or both of those included limits are also included in the invention As used in the specification and appended claims, the terms "a," "an," and "the" include both singular and plural referents, unless the context clearly dictates otherwise. Thus, for example, "a conduit" includes one conduit and plural conduits. Unless otherwise indicated, the terms "first", "second", "third", and other ordinal numbers are used herein to distinguish different elements of the present devices and methods, and are not intended to supply a numerical limit. Reference to first and second pipettor positions should not be interpreted to mean that the apparatus only has two pipettor positions. A device having first and second element can also include a third, a fourth, a fifth, and so on, unless otherwise indicated.

Although any methods and materials similar or equivalent to those described herein can also be used in the practice or testing of the present teachings, some exemplary methods and materials are now described. All patents and publications referred to herein are expressly incorporated by reference.

REFERENCES

Ohlin U.S. Pat. No. 3,552,212
Iwata et al. U.S. Pat. No. 4,495,149
Mahaffey et al. U.S. Pat. No. 5,506,142
Nagai U.S. Pat. No. 5,592,959
Fose et al. U.S. Pat. No. 5,827,744
Fürst et al. U.S. Pat. No. 6,422,248 B1
Fürst et al. U.S. Pat. No. 7,300,525 B2
Dockrill et al. U.S. Pat. No. 10,228,382 B2
Safavi et al. US Pat. App. Publication No. 2014/0318574 A1
Shimase et al. US Pat. App. Publication No. 2014/0377132 A1
Dockrill et al. US Pat. App. Publication No. 2015/0276772 A1
Smith et al. US Pat. App. Publication No. 2016/0101423 A1

Pirsch DE Pub. No. 102 07 499 A1
Tomasso et al. EP Pat. App. Publication No. 0 725 279 A1
Kazutomi Yokota JP Published Application No. 62-242858

EXEMPLARY EMBODIMENTS

Exemplary embodiments provided in accordance with the presently disclosed subject matter include, but are not limited to, the following:

Embodiment 1. a pipette wash device comprising a main body comprising a wash chamber; and a mister configured for forming a mist in the wash chamber from a washing liquid and applying the mist to the exterior of a pipette tip. In some embodiments, the main body defines a cavity configured for holding the mister.

Embodiment 2. The device of embodiment 1, wherein the mister comprises a nozzle that mixes liquid and gas to form the mist.

Embodiment 3. The device of embodiment 1 or 2, wherein the main body comprises the wash chamber, a liquid channel, a gas channel, and a nozzle cavity, wherein the liquid channel and the gas channel are fluidically connected with the nozzle cavity, and the nozzle cavity has a nozzle cavity exit fluidically connected with the wash chamber; and the mister comprises a nozzle is configured for mixing liquid and gas at the nozzle exit to form a mist from the liquid and the gas, and the device is configured for spraying the mist into the wash chamber. A nozzle comprising a central nozzle channel and a peripheral nozzle channel for passing fluids to a nozzle exit, wherein the central nozzle channel is fluidically connected with the liquid channel, and the peripheral nozzle channel is fluidically connected with the gas channel, and the nozzle is positioned in the nozzle cavity so that the nozzle exit is fluidically connected with the wash chamber.

Embodiment 4. The device of embodiment 3, wherein the nozzle cavity is a plurality of nozzle cavities arranged around the wash chamber; the nozzle is a plurality of nozzles; the liquid channel is a plurality of liquid channels, wherein each of the liquid channels fluidically connects one of the nozzles to a liquid inlet of the main body; and the gas channel is a plurality of gas channels, wherein each of the gas channels fluidically connects one of the nozzles to a gas inlet of the main body.

Embodiment 5. The device of embodiment 4, wherein the liquid inlet is a single liquid inlet in the main body, and/or the gas inlet is a single gas inlet in the main body.

Embodiment 6. The device of any of embodiments 1 to 5, wherein the nozzle comprises a nozzle cap and a nozzle restrictor, and the nozzle restrictor comprises the central nozzle channel and the nozzle exit, the nozzle cap defines a nozzle flow path from the liquid channel of the main body to the central nozzle channel of the nozzle restrictor, and the nozzle cap comprises an alignment feature reciprocal to an alignment feature the main body. In some embodiments, the nozzle restrictor comprises a flange comprising perforations, wherein the nozzle restrictor is positioned so that the perforations are fluidically connected with the gas channel of the main body. In some embodiments, the nozzle restrictor comprises an alignment surface reciprocal to an alignment surface of the main body.

Embodiment 7. The device of embodiment 6, further comprising a seal material positioned between the nozzle restrictor and a nozzle cavity wall, and/or a seal material positioned between the nozzle cap and the nozzle cavity wall.

Embodiment 8. The device of any of embodiments 1 to 7, wherein the mister comprises an ultrasonic device.

Embodiment 9. The device of any of embodiments 1 to 8, the main body further comprises a plenum fluidically connected to a gas inlet of the main body, and the device further comprises an air knife between the plenum and the wash chamber.

Embodiment 10. The device of embodiment 9, wherein air knife is formed by a conical slit positioned at a downward diagonal angle to a wash chamber entrance, whereby an air knife is produced when gas is provided to the plenum.

Embodiment 11. The device of embodiment 10, further comprising a top cap attached to the main body and positioned to cover the plenum, and the top cap and the main body define the conical slit.

Embodiment 12. The device of embodiment 10, further comprising a top cap attached to the main body and having a top cap aperture configured to accelerate air or gas being drawn into the main body.

Embodiment 13. The device of any of embodiments 1 to 12, wherein the wash chamber has a wash chamber entrance for entry a pipette tip and a wash chamber exit, and the device further comprises an exhaust tube fluidically connected to the wash chamber exit.

Embodiment 14. The device of embodiment 13, wherein the exhaust tube undercuts the wash chamber exit.

Embodiment 15. A pipette tip washing system comprising the device of any of embodiments 1 to 14; and a pump or vacuum fluidically connected to the exhaust tube.

Embodiment 16. A pipette tip washing system comprising the device of any of embodiments 1 to 15; and a pump or vacuum fluidically connected to the mister.

Embodiment 17. A pipette tip washing system comprising the device of any of claims 9 to 12; and a pump or vacuum fluidically connected to the mister.

Embodiment 18. The system of embodiment 15, further comprising an apparatus such as a pipettor configured for pushing a fluid through an interior of a pipette tip, and the pipette wash device is configured for washing an exterior of a pipette tip. In some embodiments, the pipettor or other apparatus comprises valves and passages for introducing liquid and pressurized air to the interior of the pipette tip.

Embodiment 19. A method of washing a pipette tip comprising: inserting a pipette tip in the wash chamber of a pipette wash device according to any of embodiments 1 to 14; spraying a mist formed from a washing liquid on an exterior surface of the pipette tip; and removing the washing liquid from the exterior surface.

Embodiment 20. A method of washing a pipette tip comprising providing liquid to an interior of said pipette tip; and providing a mist to at least a portion of an exterior of said pipette tip.

Embodiment 21. The method of embodiment 20, comprising blowing pressurized air or inert gas on the exterior surface of the pipette tip, thereby washing and drying the pipette.

Embodiment 22. The method of embodiment 20 or 21, wherein the sprayed mist covers substantially all of the exterior surface of the pipette tip.

Embodiment 23. The method of any of embodiments 20 to 22, wherein the mist is formed with 1.5 μl or less of a washing liquid per wash, or 0.75 μl or less of a washing liquid per pass.

Embodiment 24. The method of any of embodiments 20 to 23, wherein the method comprises at least 2 cycles of spraying the mist and blowing air or inert gas.

Embodiment 25. The method of any of embodiments 20 to 24, wherein the method excludes submersion of the pipette tip in a wash liquid such as a wash bath.

Embodiment 26. The method of any of embodiments 20 to 25, wherein the mist is formed by a nozzle. In some embodiments, the nozzle comprises a central nozzle channel and a peripheral nozzle channel for passing fluids to a nozzle exit, and the nozzle exit is fluidically connected with the wash chamber.

Embodiment 27. The method of embodiment 26, wherein the wash chamber is within a main body, and the main body further comprises a liquid channel, a gas channel, and a nozzle cavity, wherein the liquid channel and the gas channel are fluidically connected with the nozzle cavity, and the nozzle cavity has a nozzle cavity exit fluidically connected with the wash chamber. In some embodiments, the central nozzle channel is fluidically connected with the liquid channel, and the peripheral nozzle channel is fluidically connected with the gas channel.

Embodiment 28. The method of any of embodiments 20 to 27, wherein the liquid is deionized water and the gas is air.

Embodiment 29. The method of any of embodiments 20 to 28, further comprising washing the interior of the pipette tip by passing one or more series of liquid slugs separated by gaseous gaps through the pipette tip.

Embodiment 30. The method of embodiment 29, wherein gas flow to produce the gaseous gaps comprises different flow rates and/or pressures during the washing step.

Embodiment 31. The method of embodiment 29 or 30, wherein a first series of liquid slugs comprises a wash buffer, and a second series of liquid slugs comprises deionized water.

Embodiment 32. The method of any of embodiments 29 to 31, wherein the liquid slugs have a volume from about 10 μl to about 100 μl, or about 30 μl.

Embodiment 33. The method of any of embodiments 29 to 32, further comprising purging the interior of the pipette tip with pressurized air or inert gas to push substantially all of the liquid slugs and contaminant, if any, out of the pipette tip.

Embodiment 34. The method of any of embodiments 20 to 33, wherein the liquid is provided to the interior of said pipette tip by a pipettor.

Embodiment 35. The method of any of claims 20 to 33, wherein the liquid is provided to the interior of said pipette tip by a wash arm.

Embodiment 36. A pipette tip washing apparatus comprising a liquid source configured to provide liquid to an interior of a pipette tip; and a mister configured to provide a mist to at least a portion of an exterior of said pipette tip.

Embodiment 37. The pipette tip washing apparatus of embodiment 36, wherein the liquid source is a pipettor configured to provide liquid to the interior of the pipette tip when the pipette tip is attached to the pipettor.

Embodiment 38. The pipette tip washing apparatus of claim 36, wherein the liquid source is a wash arm configured to provide liquid to the interior of the pipette tip when the pipette tip is attached to the wash arm.

Embodiment 39. The pipette tip washing apparatus of claim 37 or 38, wherein said pipettor or said wash arm is configured to provide liquid in the form of liquid slugs to the interior of said pipette tip.

Embodiment 40. The pipette tip washing apparatus of embodiment 37 or 38, wherein said pipettor or said wash arm is configured to provide the liquid slugs at a volume from about 10 μl to about 100 μl, or about 30 μl.

Embodiment 41. The pipette tip washing apparatus of any of embodiments 37 or 38, wherein said pipettor or said wash arm is configured to provide gaseous gaps to the interior of said pipette tip.

Embodiment 42. The pipette tip washing apparatus of any of embodiments 36 to 41, wherein the mister comprises a nozzle that mixes liquid and gas to form the mist.

Embodiment 43. The pipette tip washing apparatus of any of embodiments 36 to 42, further comprises an air knife configured to provide a high-velocity directed air stream to an exterior of said pipette tip.

Embodiment 44. The pipette tip washing apparatus of any of claims 36 to 43, further comprising a wash station aperture configured to receive a pipette tip and accelerate air or gas drawn over an exterior of said pipette tip.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A pipette wash device comprising:

a main body comprising a wash chamber and a plenum fluidically connected to a gas inlet of the main body, wherein the main body comprises a frustoconical recession, a conical air knife slit between the plenum and the wash chamber, a mister configured for forming a mist in the wash chamber from a washing liquid and applying the mist to an exterior of a pipette tip, and a top cap attached to the main body and comprising a frustoconical protrusion, wherein a gap between the frustoconical protrusion and the frustoconical recession define the conical air knife slit.

2. The device of claim 1, wherein the mister comprises a nozzle that mixes liquid and gas to form the mist.

3. The device of claim 1, wherein:

the main body comprises the wash chamber, a liquid channel, a gas channel, and a nozzle cavity, wherein the liquid channel and the gas channel are fluidically connected with the nozzle cavity, and the nozzle cavity has a nozzle cavity exit fluidically connected with the wash chamber; and the mister comprises a nozzle configured for mixing liquid and gas at the nozzle exit to form the mist from the liquid and the gas, and the device is configured for spraying the mist into the wash chamber.

4. The device of claim 3, wherein the nozzle cavity is a plurality of nozzle cavities arranged around the wash chamber;

the nozzle is a plurality of nozzles;

the liquid channel is a plurality of liquid channels, wherein each of the liquid channels fluidically connects one of the nozzles to a liquid inlet of the main body; and the gas channel is a plurality of gas channels, wherein each of the gas channels fluidically connects one of the nozzles to a gas inlet of the main body.

5. The device of claim 4, wherein the liquid inlet is a single liquid inlet in the main body, and/or the gas inlet is a single gas inlet in the main body.

6. The device of claim 1, wherein the nozzle comprises a nozzle cap and a nozzle restrictor, and the nozzle restrictor comprises a central nozzle channel and a nozzle exit, the nozzle cap defines a nozzle flow path from the liquid channel of the main body to the central nozzle channel of the nozzle restrictor, and the nozzle cap comprises an alignment feature reciprocal to an alignment feature the main body.

7. The device of claim 6, further comprising a seal material positioned between the nozzle restrictor and a nozzle cavity wall, and/or a seal material positioned between the nozzle cap and the nozzle cavity wall.

8. The device of claim 1, wherein the mister comprises an ultrasonic device.

9. The device of claim 1, wherein the air knife is formed by the conical air knife slit positioned at a downward diagonal angle to a wash chamber entrance, whereby the air knife is produced when gas is provided to the plenum.

10. The device of claim 9, wherein the top cap is positioned to cover the plenum.

11. The device of claim 9, wherein the top cap has a top cap aperture configured to accelerate air or gas being drawn into the main body.

12. The device of claim 1, wherein the wash chamber has a wash chamber entrance for entry a pipette tip and a wash chamber exit, and the device further comprises an exhaust tube fluidically connected to the wash chamber exit.

13. The device of claim 12, wherein an exhaust tube undercuts the wash chamber exit.

14. A pipette tip washing system comprising the device of claim 1;

and a pump or vacuum fluidically connected to an exhaust tube.

15. The system of claim 14, further comprising an apparatus configured for pushing a fluid through an interior of a pipette tip, and the pipette wash device is configured for washing the exterior of a pipette tip.

16. A method of washing a pipette tip comprising:

inserting a pipette tip in the wash chamber of a pipette wash device according to claim 1;

spraying a mist formed from a washing liquid on an exterior surface of the pipette tip; and removing the washing liquid from the exterior surface.

* * * * *